No. 841,573. PATENTED JAN. 15, 1907.
W. E. SCHNEIDER.
VEHICLE WHEEL.
APPLICATION FILED APR. 5, 1906.
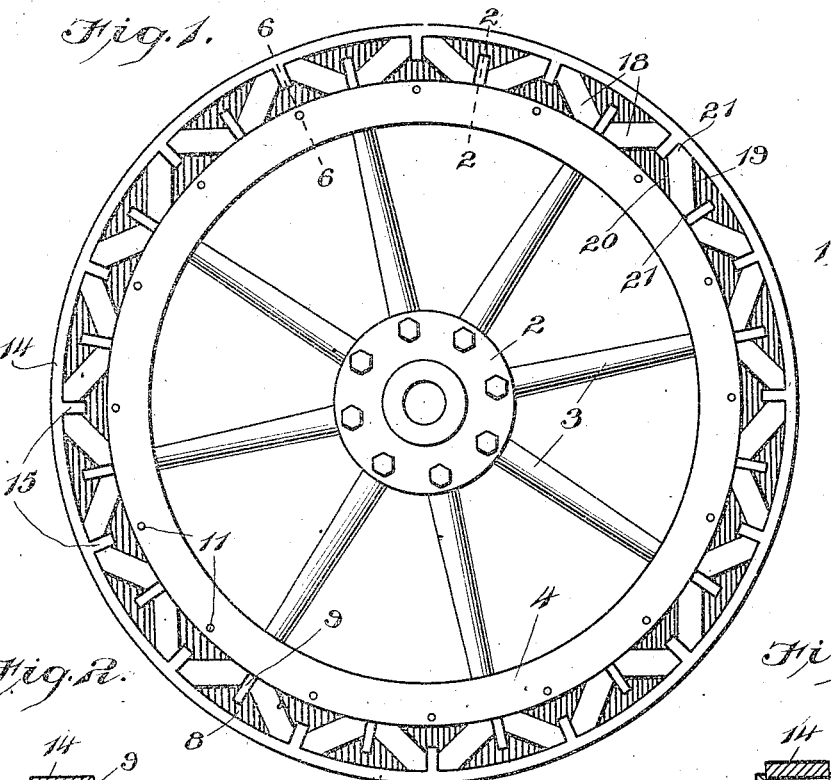
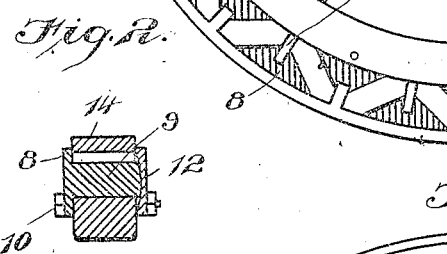
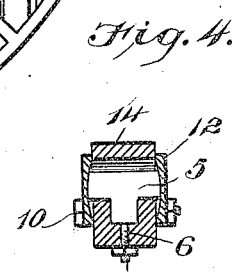
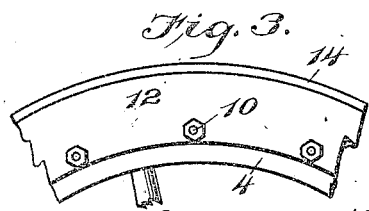
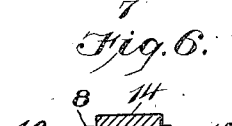
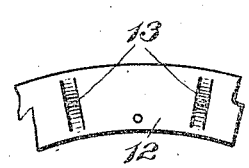
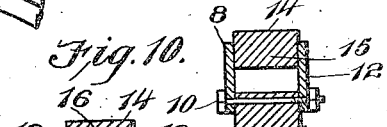
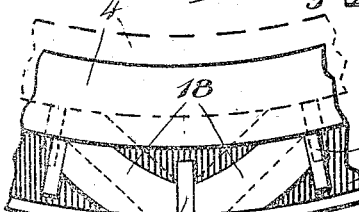
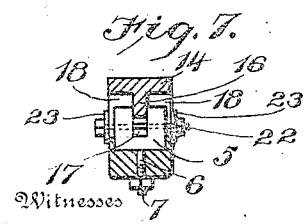
Witnesses
J. P. Britt
E. C. Duffy
Inventor
W. E. Schneider
By O. E. Duffy
Attorneys

UNITED STATES PATENT OFFICE.

WILLIAM EDWIN SCHNEIDER, OF WASHINGTON, DISTRICT OF COLUMBIA.

VEHICLE-WHEEL.

No. 841,578.   Specification of Letters Patent.   Patented Jan. 15, 1907.

Application filed April 5, 1906. Serial No. 310,115.

*To all whom it may concern:*

Be it known that I, WILLIAM EDWIN SCHNEIDER, a citizen of the United States, residing at Washington, in the District of Columbia, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle-wheels, but more particularly to wheel-tires, and has for its object to provide a resilient tire to perform the functions of the usual solid-rubber, cushion, or pneumatic tires.

A further object of my invention is to provide a perfectly resilient tire which has a metal rim or tread and which cannot be cut or punctured as usual with rubber tires.

With these objects in view my invention consists in the novel construction of the rim of the wheel; and my invention particularly consists in the novel construction of the rubber blocks, struts, or pieces, all of which will be first fully described and afterward specifically pointed out in the appended claims.

I am aware that rubber balls and similar pieces of rubber have been employed between the outer metal rim and the felly of the wheel, but by reason of the form of these rubber balls and other pieces of rubber little or no resiliency is imparted to the wheel, as will appear from the further description of my invention. However, it will be seen that all of the resiliency of rubber is imparted to the wheel and a wheel constructed in accordance with my invention is more resilient than a wheel having a solid-rubber tire.

Referring to the accompanying drawings, Figure 1 is an elevation of a wheel constructed in accordance with my invention. Fig. 2 is a vertical section through the tire and felly, taken on line 2 2 of Fig. 1. Fig. 3 is a fragmentary view of a portion of the tire and felly of the wheel, showing the face-plate in position thereon. Fig. 4 is a vertical section through the tire and felly of a wheel, showing a slight modification. Fig. 5 is a fragmentary view of a portion of the inner side of the face-plate of the wheel. Fig. 6 is a vertical section through the tire and felly of the wheel, taken on line 6 6 of Fig. 1. Fig. 7 is a vertical section through the rim and felly of a wheel, showing the tire of the wheel provided with a web. Fig. 8 is an enlarged view showing the normal position of the rubber blocks, struts, or pieces in dotted lines and the position of the same under compression in full lines; and Fig. 9 is a perspective view of one of the rubber blocks, struts, or pieces. Fig. 10 is a vertical section through the tire and felly of a wheel, showing the tire of the wheel provided with a web and also illustrating the face-plates thereon.

Like numerals of reference indicate the same parts throughout the several figures, in which—

1 indicates the wheel having the hub 2, spokes 3, and felly 4.

As shown in Figs. 4 and 7, stops 5 are provided at intervals on the outside of the felly 4, said stops being provided with a bolt 6 and a nut 7, so as to secure the said stops firmly to the felly of the wheel.

As shown in Figs. 1 and 2, however, it will be seen that a face-plate 8 is provided upon which is formed a series of stops 9, which project over the felly 4 of the wheel. The said face-plate 8 is provided with a series of perforations through which a bolt 10 passes, and the felly 4 is also provided with a series of perforations 11, through which said bolts 10 pass in order to firmly and permanently secure the face-plate 8 to the felly of the wheel. When employing this construction just described, a similar face-plate 12 is secured as shown in Fig. 3 in order to protect the space between the felly and the tire from dirt and dust and also to securely hold the rubber blocks, struts, or pieces in position.

As shown in Fig. 5, the face-plate 12 is provided with a series of grooves 13, within which the stops 9 on the face-plate 8 enter in order to press said stops and to give additional strength thereto.

Referring now particularly to the tire 14, it will be seen from Figs. 1 and 6 that a series of stops 15 are provided on the inner face of said tire, said stops being arranged between stops 9 on the felly of the wheel, and by referring to Fig. 7 it will be seen that a web 16 is provided centrally around the inner face of the tire 14, and the stops 5, which are secured to the felly of the wheel, are provided with a centrally-located slot 17, within which the said web 16 enters in order to securely hold said web and tire 14 in position on the wheel.

Referring to the diagonal rubber blocks, struts, or pieces 18, it will be seen from Figs. 1 and 9 that said blocks have normally two flat faces 19 and 20 and that the ends of said blocks, struts, or pieces are beveled to points 21. As shown in Fig. 1, the said blocks or struts are arranged between the felly of the wheel and the inner face of the tire 14, the beveled ends of the said blocks or struts fitting snugly against the stops on the felly of the wheel and on the inner face of the tire.

In the construction shown in Fig. 7 a series of blocks or struts 18, arranged in pairs, are provided, one on each side of the web 16 on the tire, and a transverse bolt 22, having suitable washers 23, is passed through each pair of blocks or struts 18 for the purpose of holding the same in position between the felly of the wheel and the tire.

Having thus described the several parts of my invention, its operation is as follows: The parts are assembled as shown and described. Referring, however, to Fig. 8, which illustrates the action of the tire of the wheel, it will be seen that the rubber blocks, struts, or pieces 18 are shown in their normal position in dotted lines, while the position of said blocks, struts, or pieces are shown compressed or in a position they assume under compression. The action of the same is as follows: A strain on the wheel forces the felly of the wheel down into position shown in full lines in Fig. 8. This movement of the felly of the wheel toward the rim not only compresses the rubber blocks, struts, or pieces longitudinally, as shown, but also bends said blocks, struts, or pieces into position, as shown in full lines. The rubber is of course free to compress longitudinally and at the same time bend laterally, as shown, thereby allowing the felly of the wheel to freely take the position shown in full lines, which movement of the felly of the wheel gives resiliency to the entire wheel. The difference between the action of the rubber blocks, struts, or pieces as shown in my construction and the action of ordinary blocks or balls is of course apparent. In the instance of a ball it can be compressed in one direction only. By pressing the ball in one direction it expands in another, and the lateral bend which the rubber blocks, struts, or pieces assume in my construction is absent when employing ordinary rubber blocks or balls.

By experience I have ascertained that the use of a rubber ball or square block in place of the rubber blocks, struts, or pieces I employ renders little or no resiliency to the wheel, as the necessary compression in both directions is practically impossible to obtain unless the ball is put under enormous strain. In order for a wheel to be resilient, it is essential that it should give to the least shock; otherwise the same jar will be occasioned as if the wheel were provided with the usual metal tire.

Having thus fully described my invention, what I claim as new, and desire to secure by Letters Patent of the United States, is—

1. In a wheel of the character described, the combination with the felly of a wheel, of a tire, a series of radially-extending stops on said felly, a series of radially-extending stops on said tire, and a series of flexible struts having one end thereof in engagement with said stops on said felly and the other end thereof in engagement with said stops on said tire, substantially as described.

2. In a wheel of the character described, the combination with the felly of a wheel, of a tire, a face-plate arranged to be secured to the said felly, a series of stops associated with said felly and face-plate, a series of stops on said tire, and a series of flexible struts having one end thereof in engagement with the said stops associated with said felly and the other end thereof in engagement with said stops on said tire, substantially as described.

3. In a wheel of the character described, the combination with the felly of a wheel, of a tire, a series of radially-extending stops on said felly, a series of radially-extending stops on said tire, a web on the inner face of said tire arranged to enter said stops on said felly and a series of flexible struts interposed between said tire and said felly, substantially as described.

4. In a wheel of the character described, the combination with the felly of a wheel, of a tire, a series of stops associated with said felly, a series of stops associated with said tire, a web or extension on the inner face of said tire arranged to engage a stop associated with said felly, and a series of flexible struts interposed between said felly and said tire, substantially as described.

5. In a wheel of the character described, the combination with a felly of a wheel, of a tire, a series of flexible struts interposed between said felly and said tire, and a series of stops on said felly and tire for engagement with said flexible struts, said struts being so arranged as to compress longitudinally and bend laterally when the wheel is subjected to strain, substantially as described.

6. In a wheel of the character described, the combination with the felly of a wheel, of a tire, a series of radially-extending stops on said felly, a series of radially-extending stops on said tire, and a series of diagonal struts arranged between the said tire and the said felly, said diagonal struts having one end thereof in engagement with said stops on said felly and the other end thereof in engagement with said stops on said tire, substantially as described.

In testimony whereof I affix my signature in presence of two witnesses.

WILLIAM EDWIN SCHNEIDER.

Witnesses:
JOHN L. FLETCHER,
C. HUGH DUFFY.